2,709,228

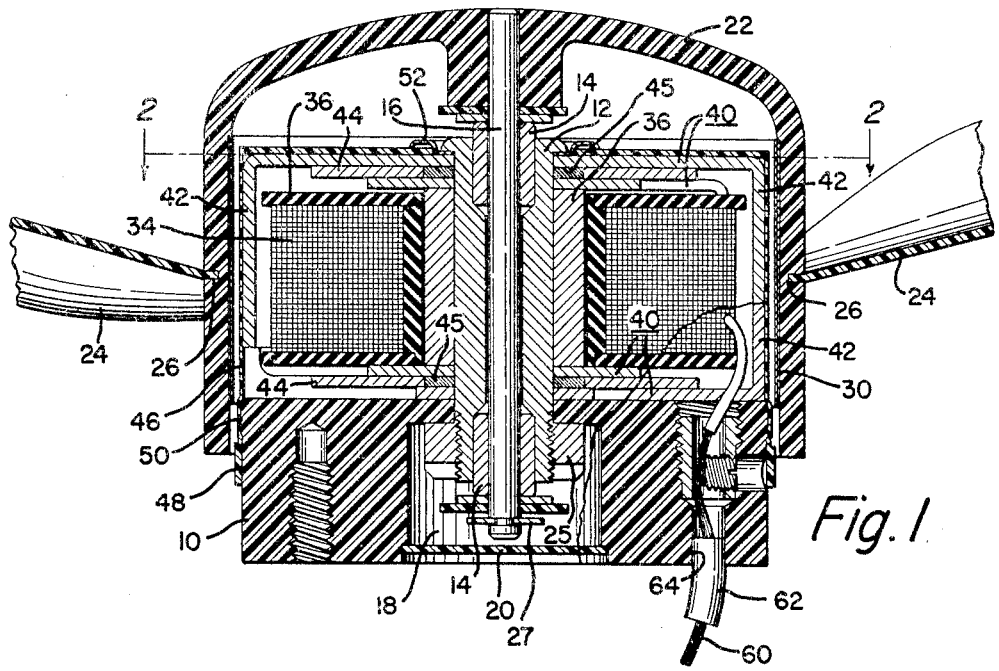
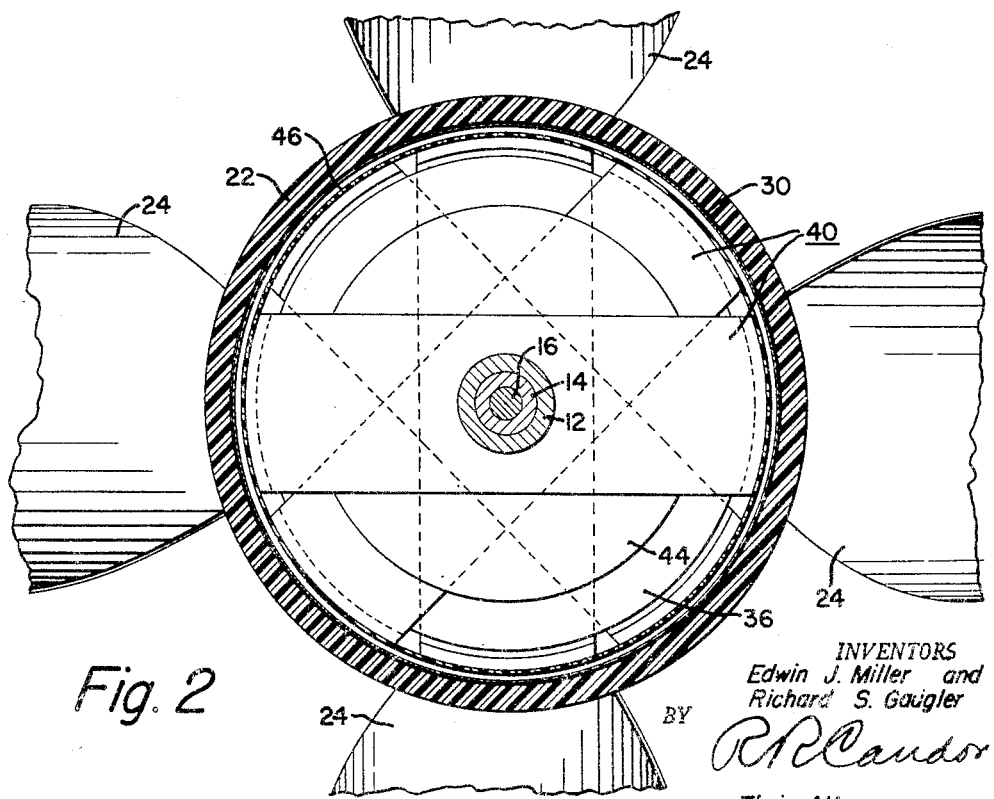
Fig. 1
Fig. 2
INVENTORS
Edwin J. Miller and
Richard S. Gaugler
BY
R R Candor
Their Attorney United States Patent Office 2,709,228
Patented May 24, 1955

ELECTRIC MOTOR

Edwin J. Miller and Richard S. Gaugler, Dayton, Ohio, assignors to General Motors Corporation, Detroit, Mich., a corporation of Delaware Application September 17, 1953, Serial No. 380,718

3 Claims. (Cl. 310—40)

This invention relates to refrigerating apparatus and more particularly to a moisture- and dustproof fan for use in circulating air in thermal exchange relationship with the evaporator of a household refrigerator.

It is an object of this invention to provide a moisture-proof fractional horsepower motor which may be manufactured at a low cost.

Another object of this invention is to provide a low cost refrigerator fan motor in which all parts except those forming the magnetic and electrical paths are made of plastic.

A further object of this invention is to provide a sealed, fractional horsepower, low cost motor which is self-starting and self-lubricating.

Further objects and advantages of the present invention will be apparent from the following description, reference being had to the accompanying drawings wherein a preferred embodiment of the present invention is clearly shown.

In the drawings:

Figure 1 is a vertical sectional view showing the internal construction of a fan motor embodying the invention; and, Figure 2 is a sectional view taken substantially on line 2—2 of Figure 1.

Referring now to the drawings wherein a preferred embodiment of the invention has been shown, reference numeral 10 designates a plastic base which serves as the main support for the other elements. The base 10 supports a metallic sleeve 12 which in turn supports a pair of bearing inserts 14. The bearing inserts 14 are of the non-corrosive oilless type such as sintered powdered metal impregnated with lubricant or polytetrafluoroethylene containing brass powder and rotatably support the main motor shaft 16. It will be noted that the bearing inserts contact the main shaft 16 at spaced points only so as to reduce the frictional resistance and so as to provide clearance for a small quantity of lubricant if desired.

The lower end of the bearing support 12 and the shaft 16 project into a sealed chamber 18 which is closed by means of a disc 20 which is preferably made of polymethylmethacrylate and which prevents the introduction of moisture and dust into the lower bearing chamber 18. A plastic cap or housing 22 is molded or otherwise secured to the outwardly projecting end of the shaft 16 and this housing serves as the rotor for the motor and supports a plurality of fan blades 24 which fit into slots 26 in the outer periphery of the housing 22. A nut 25 is provided on the lower end of the sleeve 12 as shown and a conventional snap or washer is provided on the lower end of the shaft 16. This washer prevents removal of the shaft when the fan is inverted.

The motor is of the hysteresis type in which a pair of metal bands or straps 30 carried by the inner wall of the housing 22 operate in a magnetic field set up by a field winding 34. The stator or field winding 34 is supported on a plastic spool 36 which is mounted on a metallic sleeve 36 surrounding the central metallic sleeve 12. The pole pieces 40 are each formed as sheet metal stampings in the shape of a U. The arms 42 of the U-shaped pole pieces surround the outer periphery of the field winding 34 so as to establish magnetic poles closely adjacent to the metallic bands or straps 30 carried by the housing 22. There are four of the U-shaped pole piece elements in each motor. Two of the four are inverted whereby there are two pole pieces mounted at each end of the spool and the arms thereof lie parallel to the outer periphery of the spool.

In order to make the motor self-starting, a shading coil 44 of copper is placed between each pair of the U-shaped pole pieces so as to provide a self-starting motor having the necessary revolving magnetic field. The shading coils 44 are in effect copper washers. A steel or iron washer 45 centers each of the shading coils on the metallic sleeve 12 as shown in Figure 1.

In a motor designed for use in the food storage compartment of a refrigerator or the like, it is necessary to protect the vital parts of the motor from moisture and dust and for that purpose there has been provided an inverted thin-walled plastic cup or envelope 46 which completely encloses the pole pieces and stator winding. It will be noted that the lower edge of the plastic cup 46 is provided with a thickened edge portion 48 which firmly grips the outer periphery of the base 10. It will be also noted that the base 10 is slightly larger in diameter adjacent its upper edge as indicated at 50 so as to provide interlocking engagement between the bottom edge of the inverted cup-shaped protector 46 and the outer periphery of the upper portion of the base 10. A spring pressed washer element 52 serves to clamp the plastic protector 46 into a firm sealing engagement with the upper surface of the pole piece 40 at that point where the metallic sleeve 12 passes through the protector 46.

The leads 60 for conveying current to the field winding 34 are provided with a plastic insulating covering 62 which has a press fit within apertures 64 in the bottom portion of the base 10 so as to prevent the introduction of dust or moisture into the field winding.

While the form of embodiment of the invention as herein disclosed constitutes a preferred form, it is to be understood that other forms might be adopted, as may come within the scope of the claims which follow:

What is claimed is as follows:

1. In an electric motor, a plastic base, a metallic bearing support carried by said base and projecting from one side of said base, an armature shaft journalled in said bearing support, a plastic spool carried by said support, field winding means on said plastic spool, pole pieces cooperating with said field winding means to produce a revolving magnetic field, a nonmagnetic cup-shaped plastic shell for enclosing said pole pieces and said field winding means, a rotor shaft in said bearing support, a cup-shaped plastic rotor carried by said shaft, and a magnetic band type armature supported on the inner wall of said plastic rotor.

2. In an electric motor, a plastic base, a metallic bearing support carried by said base and projecting from one side of said base, an armature shaft journalled in said bearing support, a plastic spool carried by said support, field winding means on said plastic spool, pole pieces cooperating with said field winding means to produce a revolving magnetic field, a nonmagnetic cup-shaped plastic shell for enclosing said pole pieces and said field winding means, a rotor shaft in said bearing support, a cup-shaped plastic rotor carried by said shaft, and a magnetic band type armature supported on the inner wall of said plastic rotor, the lower edge of said cup-shaped shell having a rim thicker than the main walls thereof, said base having a portion projecting into said shell, the outer circumference of said last named portion being greater than the normal inner circumference of said shell whereby a dust- and moistureproof joint is formed between said shell and said base.

3. In an electric motor, a plastic base, a metallic bearing support carried by said base and projecting from one side of said base, an armature shaft journalled in said bearing support, a plastic spool carried by said support, field winding means on said plastic spool, pole pieces cooperating with said field winding means to produce a revolving magnetic field, a nonmagnetic cup-shaped plastic shell for enclosing said pole pieces and said field winding means, a rotor shaft in said bearing support, a cup-shaped plastic rotor carried by said shaft, and a magnetic band type armature supported on the inner wall of said plastic rotor, said magnetic band comprising a pair of flat steel springs bent into circular shape and held in place by said cup-shaped plastic rotor, said plastic rotor having an internally disposed recess for receiving and positioning said steel springs, said springs being held in place within said recess by their own resiliency.

References Cited in the file of this patent

UNITED STATES PATENTS

| | | |
|---|---|---|
| 1,933,440 | Kurz | Oct. 31, 1933 |
| 2,048,421 | Ballentine | July 21, 1936 |
| 2,070,447 | Morrill | Feb. 9, 1937 |
| 2,237,961 | Hansen et al. | Apr. 8, 1941 |
| 2,427,947 | Koch | Sept. 23, 1947 |
| 2,432,291 | Dayton | Dec. 9, 1947 |
| 2,495,895 | Hervert | Jan. 31, 1950 |
| 2,538,196 | Hildebrand et al. | Jan. 16, 1951 |
| 2,603,161 | Lloyd | July 15, 1952 |